Nov. 10, 1959  C. ZELNICK  2,911,726
INDICATOR
Filed Dec. 27, 1954
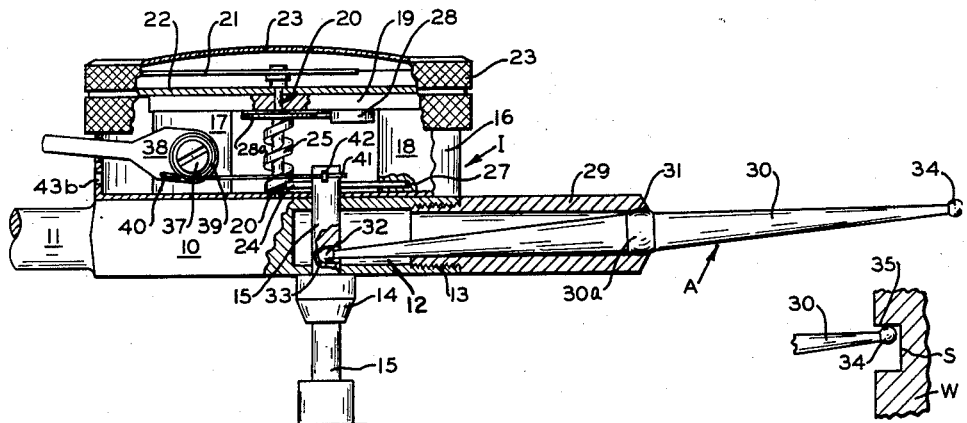
FIG. 1
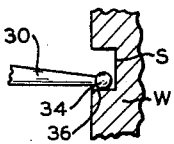
FIG. 3
FIG. 4
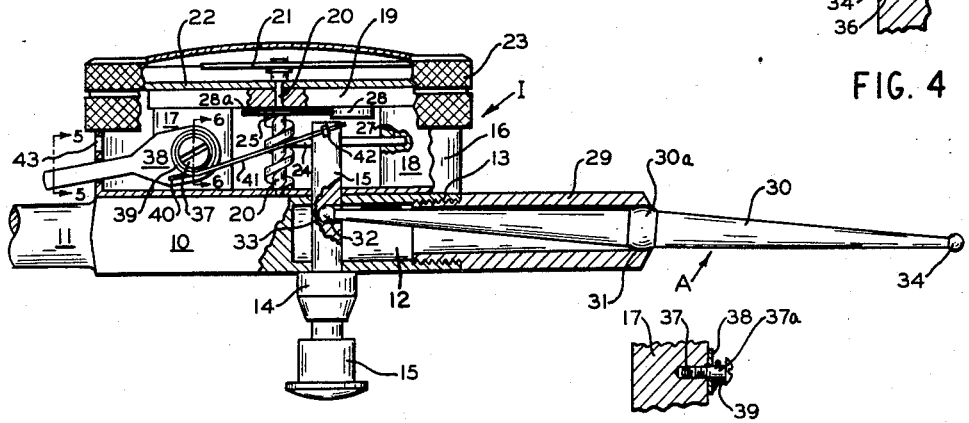
FIG. 2
FIG. 6
FIG. 5
INVENTOR.
CHARLES ZELNICK
BY
*Fearman & Fearman*
ATTORNEYS United States Patent Office 2,911,726
Patented Nov. 10, 1959

2,911,726

INDICATOR

Charles Zelnick, Saginaw, Mich., assignor to The Lufkin Rule Company, Saginaw, Mich.

Application December 27, 1954, Serial No. 477,811

4 Claims. (Cl. 33—172)

This invention relates to indicators and more particularly to an indicator in which the indicating plunger can be selectively positioned to permit the checking of oppositely disposed surfaces without inverting the indicator.

Briefly the invention contemplates a plunger which is so associated with an adjusting member that it can be maintained in either an "in" or "out" position by resilient means which permits displacement of the plunger and returns it to the position in which it was set when permitted to do so.

One of the prime objects of the instant invention is to design an indicator which can be employed to check a pair of opposed surfaces such as the two marginal side walls of a groove or slot without substantially changing the position of the indicator and "losing" its general locating position.

Another object of the invention is to provide an indicator which can be employed in upright position to check upper surfaces, as well as under surfaces so that the dial need not ever be read from underneath.

A further object of the invention is to design an indicator of this type which is extremely accurate and can be employed to check the accuracy of a multitude of surfaces such as, the walls of holes and slots, as well as the alignment of shafts, guides, and the like.

Another object of the invention is to provide an indicator of the type described which is highly reliable in operation and is of rugged and durable construction.

A further object of the invention is to provide an indicator of the character described which can be readily disassembled when necessary to permit the replacement of parts.

Another object of the invention is to design an indicator of this type in which the adjusting means for moving the plunger to one or the other of its positions is locked in position in the casing of the indicator so that it cannot slip if the indicator is jarred.

A still further object of the invention is to design an indicator of the character described which is extremely simple and practical and can be very economically manufactured and assembled.

With the above and other objects in view, the present invention consists in the combination and arrangement of parts hereinafter more fully described, illustrated in the accompanying drawing, and more particularly pointed out in the appended claims, it being understood that equivalent changes may be made in the various elements which comprise the invention without departing from the spirit thereof or the scope of the appended claims.

In the drawing:

Fig. 1 is a part sectional elevational view of the indicator with the plunger in "out" position.

Fig. 2 is a similar view with the adjusting lever pivoted to position the plunger in its "in" position.

Fig. 3 is a fragmentary, elevational view showing the attachment finger of the indicator disposed as in Fig. 1 in position to measure the upper marginal wall of a groove in a workpiece.

Fig. 4 is a fragmentary elevational view showing the attachment finger of the indicator disposed as in Fig. 2 in position to measure the lower marginal wall of the same slot.

Fig. 5 is a fragmentary, elevational view taken on the line 5—5 of Fig. 2 showing the slot in the indicator casing out which the adjusting lever for the indicator plunger extends.

Fig. 6 is a transverse sectional view taken on the line 6—6 of Fig. 2.

Referring now more particularly to the accompanying drawing, wherein I have shown a preferred embodiment of the invention, a letter I generally designates my indicator which is of the general type disclosed in Patent No. 2,345,845 issued April 4, 1944 to Earl J. Wells. Such an indicator includes a base 10 with an integrally formed extension or shank 11 projecting from one end thereof to facilitate mounting the instrument adjacent the surface to be checked. The opposite end of the base is provided with a bored opening 12 which is interiorly threaded as at 13 to receive an inside attachment A in the usual manner. Supported in a bearing 14 on the base 10 is the conventional plunger or operating spindle 15 which as shown extends through the base 10 at substantially right angles to the attachment A and into an annular dial casing 16 which is supported on the base 10 to enclose certain of the operating elements of the indicator. Spacer posts 17 and 18 within the casing 16 support a plate 19 in which is journaled an indicator shaft 20 provided with a pointer 21 on the upper end thereof. A dial 22 which is suitably graduated in the usual manner is carried by the bezel and crystal assembly 23 which is rotatably mounted in the casing 16 so that the circumferential position of the dial may be adjusted relative to the pointer 21. Provided on the inner end of the plunger 15 is a transverse pin 24 which has operative engagement with a worm cam 25 formed on a lower extension of the shaft 20. The opposite end of the pin 24 extends into a slot or groove 27 formed in the fixed post 18 and it will be apparent that axial movement of the plunger or spindle 15 will revolve the shaft 20, while the plunger itself is prevented from rotating by the disposition of the pin 24 in the groove 27. The worm cam 25 is, of course, so pitched that the exact lineal movement of the plunger 15 is accurately represented by the movement of the pointer 21 relative to the dial 22. Depending from the plate 19 in position to be engaged by the end of the plunger 15 is a stop member 28 which limits inward movement of the plunger 15 and thereby rotation of the shaft 20 and a hair spring 28a which maintains the cam 25 in engagement with the pin 24 which is connected to the stop 28 and shaft 20 as usual.

The inside attachment A comprises the tubular support or sleeve 29 with the attachment arm or finger 30 swivelly mounted in a socket 31 formed in the outer end thereof. The arm 30 conventionally is enlarged intermediate its ends to form a ball joint 30A which swivels in the socket 31 and further has a ball 32 on its inner end which is received in the socket 33 provided in the plunger 15. The outer end of the arm 30 has a contact ball 34 thereon and, when the arm is pivoted in the axial plane of movement of the plunger by an irregularity in a surface being checked, clearly the plunger is moved axially to rotate the shaft 20 in accordance with the degree of pivot of the arm 30 and the pointer 21 will register the reading.

The elements thus far described are conventional and generally a spring member has been employed to load the plunger 15 so that it is normally disposed in the "out"

position in which it is shown in Fig. 1. Such an indicator can, of course, be very readily employed to check under surfaces such as the upper marginal wall 35 of the slot S (see Fig. 3) however, in order to check the lower marginal wall 36 of the slot S, obviously the indicator would have to be inverted. In so inverting the indicator the locating position of the indicator is usually changed or "lost" and, of course, the position of the pointer can only be observed from underneath so that it is difficult if not virtually impossible to accurately read the instrument. These difficulties have been overcome by providing means which enables the operator to spring load the plunger 15 in either direction so that the plunger may be initially disposed at the beginning of the checking operation in either the "in" or the "out" position dependent on the disposition of the surface it is desired to check. Thus the indicator need not be inverted when it is desired to check surfaces such as 35 and 36 consecutively.

Pivotally mounted on a shank portion 37a of a screw 37 which is threaded into the post 17 is a lever 38 which extends outside the casing 16 as shown. A coil spring 39 having one end thereof fixed to the lever 38 at 40 has its opposite extended end 41 fixed to the inner end of the plunger 15 at 42. The spring is under little or no compression when the lever is up as in Fig. 1; however, any movement of the plunger inwardly must press the end 41 of the spring upwardly and this movement is, of course, opposed by the spring. Accordingly the plunger 15 is normally maintained in "out" position when the lever 38 is up.

When the lever is pivoted to "down" position as in Fig. 2 the inner end of the spring is carried downwardly with the lever and the spring must radially or axially enlarge if the end 41 is to remain in the position in which it is shown in Fig. 1. Instead of enlarging in either manner the end 41 of the spring will move with the end 40, and will draw the plunger 15 inwardly to the position in which it is shown in Fig. 2. Any attempt to move the plunger 15 outwardly would tend to radially enlarge or axially compress the convolutions of the spring which accordingly maintains the plunger in "in" position. Formed in the annular wall of the casing 16 is the channel-shaped slot 43 out which the lever 38 extends, the slot having an upper lateral portion 43a and a lower lateral portion 43b. In normal position the lever 38 would be disposed in either the portion 43a or the portion 43b and would be figuratively locked in its "up" or "down" position; however, the lever will be formed of a material which has sufficient flexibility so that it can be pulled over into the vertical portion of the slot 43 and its position changed. Further, the lever will possess sufficient resilience so that it will return laterally into one of the portions 43a or 43b of the slot when it is released.

In operation the indicator is mounted in a chuck, fixture, or the like adjacent the work W to be checked which, for purposes of illustration will be assumed to be the slot S. With the lever 38 in "up" position as shown in Fig. 1 the ball end 34 of the arm or finger 30 will be normally maintained in "up" position by the spring 39 and the indicator will be positioned so that the ball end 34 is, as in Fig. 3, in engagement with the wall 35 of the slot S. Deviations in the straightness of the wall 35 which would tend to restrict the width of the slot S will then tend to force the end 34 of the finger 30 downwardly which forces the plunger 15 inwardly and displaces the pointer in the usual manner to register the deviation. The spring 39 will, of course, return the finger 30 to original position when permitted to do so.

To check the opposite marginal wall 36 of the slot it is merely necessary to press the lever 38 laterally until it is in alignment with the vertical portion of the slot 43 and thence press the lever 38 downwardly so that it will move into the portion 43b of the slot. The plunger 15 will then be in "in" position and the end 34 of the finger 30 will be held downwardly by the spring.

It should be apparent that I have perfected a very simple and practical double acting measuring instrument which is well suited to the purpose for which it is intended. However, it is to be understood that I do not wish to limit the application of the novel principles involved in any way and accordingly the drawing and descriptive matter in all cases are to be interpreted as illustrative of the invention rather than as limiting the scope thereof.

What I claim is:

1. In an indicator; an indicator housing; a plunger having an inner end within said housing and an outer end extending from said housing, said plunger being movable axially inwardly and outwardly to "in" and "out" positions respectively; a work engaging feeler associated with said plunger to impart movement thereto; relatively movable pointer and indicia means, one of which is connected to said plunger to register relative to the other upon movement of said plunger; a plunger operating member supported by said housing including a first part within said housing adjacent said plunger movable from one position to another position and another part extending through said housing operable to move said first part; and spring means connected to said first part and directly affixed to the inner end of said plunger maintaining said plunger in "out" position and opposing inward movement of the plunger when the said first part is in one position and the plunger is in "out" position, moving in the general plane of travel of said plunger and drawing said plunger to "in" position and opposing outward movement of the plunger when said first part moves to the other position.

2. The combination defined in claim 1 in which said spring means comprises a torsion spring with an axis generally perpendicular to the plane of travel of said plunger having one end fixed to said first part and the other end directly attached to the inner end of the plunger.

3. In an indicator; an indicator housing; a plunger, having an inner end within said housing and an outer end extending from said housing; bearing surfaces in said housing mounting said plunger for movement axially inwardly and outwardly to "in" and "out" positions respectively; a pivotal work engaging feeler associated with said plunger to impart axial movement thereto; relatively movable pointer and indicia means, one of which is connected to said plunger to register relative to the other upon movement of said plunger axially; an operating lever extending transversely through said casing, having an inner end within said housing adjacent said plunger and an outer end extending outside said housing, pivotally mounted on said casing so that the said inner end is movable through a path of travel from one position to a different position in a plane generally parallel to the movement of said plunger; and spring means fixed to the inner end of said lever offset from the pivotal axis thereof and directly attached to the inner portion of said plunger maintaining said plunger in "out" position and opposing inward movement of the plunger when the said inner end of the lever is in one position, and drawing said plunger to "in" position and opposing outward movement of the plunger when the said inner end of the lever is moved to said different position.

4. In a measuring instrument, a casing, a plunger having an inner end in said casing movable axially inwardly and outwardly to "in" and "out" positions respectively, a pivoted attachment finger associated with said plunger to impart movement thereto, a dial in said casing, a rotatable pointer shaft, a pointer associated with said dial mounted on said shaft, means translating the axial movement of said plunger into rotation of said shaft to move said pointer relative to the dial dependent on the movement of the attachment finger, spacer posts in said casing on both sides of the plunger, a transversely disposed pin projecting from one of said posts, a lever mounted on said pin to pivot in a plane parallel to an axial plane of the plunger, the lever having one end extending out of said casing, the casing having a C-shaped locking slot out which said lever extends, a torsion spring on said pin with one end connected to the inner end of said lever and the opposite end being elongated and fixed to the inner end of said plunger so as to oppose inward movement of the plunger when the lever is in one position and the plunger is in "out" position and outward movement of the plunger when the lever is pivoted to another position and the plunger is moved to "in" position.

References Cited in the file of this patent

UNITED STATES PATENTS

| | | |
|---|---|---|
| 889,853 | Levy | June 2, 1908 |
| 990,605 | Stimson | Apr. 25, 1911 |
| 1,399,272 | Ogle | Dec. 6, 1921 |
| 1,436,111 | Reich | Nov. 21, 1922 |
| 1,451,038 | Faries | Apr. 10, 1923 |
| 1,466,664 | Lowe | Sept. 4, 1923 |
| 1,744,067 | Brode | Jan. 21, 1930 |
| 2,091,376 | Reich | Aug. 31, 1937 |
| 2,345,845 | Wells | Apr. 4, 1944 |
| 2,483,743 | Turrettini | Oct. 4, 1949 |